US010941246B2

United States Patent
Kenion et al.

(10) Patent No.: US 10,941,246 B2
(45) Date of Patent: *Mar. 9, 2021

(54) TRANSESTERIFICATION OF POLYLACTIC ACID WITH NATURAL OILS

(71) Applicant: Henkel IP & Holding GmbH, Duesseldorf (DE)

(72) Inventors: Grant B. Kenion, Easton, PA (US); Alexander P. Mgaya, Cary, NC (US); Balasubramaniam Ramalingam, Cary, NC (US); Zhengmian Chang, North Brunswick, NJ (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,350

(22) Filed: Apr. 3, 2019

(65) Prior Publication Data

US 2020/0031994 A1 Jan. 30, 2020

Related U.S. Application Data

(63) Continuation of application No. 16/043,521, filed on Jul. 24, 2018, now Pat. No. 10,294,328, which is a continuation of application No. PCT/US2017/015927, filed on Feb. 1, 2017.

(60) Provisional application No. 62/289,432, filed on Feb. 1, 2016.

(51) Int. Cl.
| | | |
|---|---|---|
| *C08G 63/91* | (2006.01) |
| *C08G 63/06* | (2006.01) |
| *C08G 63/60* | (2006.01) |
| *C08G 63/85* | (2006.01) |
| *C08G 63/08* | (2006.01) |
| *B01J 31/02* | (2006.01) |
| *B01J 31/00* | (2006.01) |

(52) U.S. Cl.
CPC ........... *C08G 63/912* (2013.01); *C08G 63/06* (2013.01); *C08G 63/08* (2013.01); *C08G 63/60* (2013.01); *C08G 63/85* (2013.01); *B01J 31/00* (2013.01); *B01J 31/0212* (2013.01); *B01J 2231/49* (2013.01)

(58) Field of Classification Search
CPC .............................. C08G 63/912; C08G 63/08
See application file for complete search history.

(56) References Cited

U.S. PATENT DOCUMENTS

| | | | |
|---|---|---|---|
| 6,664,363 B1 | 12/2003 | Faunce | |
| 8,242,197 B2 | 8/2012 | Warth et al. | |
| 10,294,328 B2 * | 5/2019 | Kenion | C08G 63/06 |
| 2007/0036855 A1 | 2/2007 | Domb et al. | |
| 2009/0209727 A1 | 8/2009 | Barbier et al. | |
| 2011/0275749 A1 | 11/2011 | Uyama et al. | |
| 2012/0264905 A1 | 10/2012 | Shimura et al. | |
| 2013/0065046 A1 | 3/2013 | Krishnaswamy et al. | |
| 2015/0217028 A1 | 8/2015 | Pacetti et al. | |
| 2018/0327545 A1 | 11/2018 | Kenion et al. | |

FOREIGN PATENT DOCUMENTS

| | | |
|---|---|---|
| CN | 101104680 A | 1/2008 |
| CN | 101851326 A | 10/2010 |
| CN | 102850743 A | 1/2013 |
| CN | 104448270 A | 3/2015 |
| JP | 2006143829 A | 6/2006 |

OTHER PUBLICATIONS

Chandorkar et al. Structure, tensile properties and cytotoxicity assessment of sebacic acid based biodegradable polyesters with ricinoleic acid. J. Mater. Chem. B, 2013, 1, 865-875 (Year: 2013).*
Konda et al., "Castor Oil-Based Biodegradable Polyesters," Biomacromolecules, vol. 16, No. 9, 2015, pp. 2572-2587.
Rasal, Rahul M. et al., "Poly(lactic acid) modifications." Progress in Polymer Science, 35 (Mar. 2010), pp. 338-356.
Noureddini, H. and Zhu, D. "Kinetics of Transesterification of Soybean Oil." JAOCS, vol. 74, No. 11 (1997), pp. 1457-1463.
Soedergård, A. and Stolt, M. "Properties of lactic acid based polymers and their correlation with composition." Prog. Polym. Sci. 27 (2002) pp. 1123-1163.
Makromol. Chem. 190, (1989), pp. 2407-2415.
Coullerez, G. et al., "Synthesis of acrylate functional telechelic poly(lactic acid) oligomer by transesterification," Journal of Materials Science: Materials in Medicine, 11 (2000), pp. 505-510.
Sadik, T et al., "In-melt transesterification of poly(lactic acid) and poly(ethylene-co-vinylalcohol)," Materials Chemistry and Physics 140 (2013) pp. 559-569.

* cited by examiner

*Primary Examiner* — Michael M Dollinger
(74) *Attorney, Agent, or Firm* — James E. Piotrowski

(57) ABSTRACT

Disclosed is a transesterified polylactic acid product which has been transesterified with a diol and at least one natural oil. The transesterified polylactic acid product has surprisingly improved properties compared to unmodified polylactic acid including: a liquid state at room temperature, a reduced melting temperature and increased solubility in a variety of solvents. Also disclosed is a method for producing the transesterified polylactic acid product. The transesterified polylactic acid product is economical to produce and includes a high content of renewable resources. In addition, the product is biodegradable.

18 Claims, No Drawings

TRANSESTERIFICATION OF POLYLACTIC ACID WITH NATURAL OILS

TECHNICAL FIELD

This invention relates generally to transesterification of polymers and more particularly to transesterification of the polymer polylactic acid with natural oils.

BACKGROUND OF THE INVENTION

In the past some types of polymeric backbones have been transesterified with certain natural oils such as castor oil and soybean oil. These polymeric backbones have not included polylactic acid backbones. Polylactic acid backbones have been transesterified glycols or caprolactone. In both cases the hope was that the transesterification processes would lead to polymers with improved properties.

Polylactic acid is a biodegradable, solid thermoplastic aliphatic polyester that is derived from renewable resources such as corn starch; tapioca roots, chips or starch; or from sugarcane. Because it is biodegradable and renewable, there has been interest in expanding its uses. Structurally, it is a polyester with the repeating unit of —[CH(CH$_3$)—C(O)—O]— and thus it is not a polyacid. It has been used in the manufacture of sealant films for food packaging, cups for yogurt, biomedical devices and other applications. One limitation with use of polylactic acid in more products is the fact that the polymer is a solid but has a lack of toughness and thus its usefulness is limited. Typically polylactic acid has less than 10% elongation at break. In addition, it has low solubility in many desirable solvents and when dissolved tends to have too high of a viscosity to be useful in some applications. So ways to increase the weak physical properties of the polymer have been explored. For example, it has been blended with polycarbonates or subjected to transesterification with ethylene glycol, trimethylene glycol and polycaprolactone in attempts to lower its viscosity, increase its flexibility, and change its solubility. One of the issues with blending the polylactic acids with other compounds is that this introduces the possibility of adding extractable components into the formulation which may be undesirable especially in medical or food packaging applications. The level of extractable components can raise safety and regulatory issues. Transesterification of polylactic acid with polycarbonates does not produce the desired flexibility in the final product and the cost of production is too high. The use of m-hydroxy acids, such as mandelic acid, has been used for certain specialized medical applications, but is too costly for industrial uses. The same is true of transesterification with caprolactone; it is too costly for industrial uses and the availability of caprolactone is low.

It is desirable to produce a polymeric, transesterified polylactic acid product and method of producing the same that uses biodegradable, readily available, renewable resources wherein the produced product can be a liquid at room temperature with a low viscosity. In other variations the produced product can be a waxy solid at room temperature. The produced product is relatively inexpensive to produce.

SUMMARY OF THE INVENTION

In general terms, this invention provides for a polylactic acid that has been transesterified with natural oils such as soybean oil or castor oil and a method of producing the same.

In one embodiment the present invention is a transesterified polylactic acid product resulting from the reaction of a reaction mixture comprising: a) polylactic acid; b) at least one natural oil; c) a diol; and d) optionally, a transesterification catalyst.

In one embodiment the present invention is a transesterified polylactic acid product resulting from the reaction of a reaction mixture comprising: a) polylactic acid present in an amount of from 50 to 85 weight percent based on a total weight of a reaction mixture; b) at least one natural oil present in an amount of from 13 to 30 weight percent based on said total weight of said reaction mixture; c) a diol present in an amount of from 2 to 36 weight percent based on said total weight of said reaction mixture; and d) optionally, a transesterification catalyst.

In another embodiment the present invention is a method of transesterifying polylactic acid comprising the steps of: a) combining at least a diol, a polylactic acid and, optionally, a transesterification catalyst together to form a reaction mixture and heating it to a temperature below the degradation temperature of the reaction mixture components but sufficient to form a molten reaction mixture; b) adding to the molten reaction mixture at least one natural oil and mixing until substantially homogeneous; c) increasing the temperature to of the substantially homogeneous mixture to a temperature high enough for transesterification to proceed and maintaining the substantially homogeneous mixture at or above this temperature until transesterification is completed to a desired extent; and d) cooling the reaction mixture to a convenient temperature for handling and collecting the transesterified polylactic acid product.

In another embodiment the present invention is a method of transesterifying polylactic acid comprising the steps of: a) combining a diol, a polylactic acid and a transesterification catalyst together to form a reaction mixture and heating it to a temperature of at least 150° C., for example from 150 to 180° C., to form a molten reaction mixture; b) adding to the molten reaction mixture at least one natural oil and increasing the temperature to at least 170° C., for example from 170 to 195° C., and maintaining the temperature for a suitable reaction time, for example 3 hours; c) increasing the temperature to at least 190° C., for example from 190 to 215° C., and maintaining the temperature for a suitable reaction time, for example 4 hours; d) increasing the temperature to at least 210° C., for example 210 to 245° C., and maintaining the temperature for a suitable reaction time, for example at least 7 hours; and e) cooling the reaction mixture to a convenient temperature for handling and collecting the transesterified polylactic acid product.

The disclosed compounds include any and all isomers and steroisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

These and other features and advantages of this invention will become more apparent to those skilled in the art from the detailed description of a preferred embodiment.

BRIEF DESCRIPTION OF THE DRAWINGS

NONE.

DETAILED DESCRIPTION OF A PREFERRED EMBODIMENT

Transesterification processes are known in the art for a variety of reactive components. In the overall transesterification reaction an alcohol is reacted with an ester in the presence of a catalyst and one R group on the ester is exchanged for the R group on the alcohol: R'—OH+R"—O—C(O)—R→R"—OH+R'—O—C(O)—R. The transesterification reaction has not been applied to polylactic acid using natural oils. Conventional polylactic acid polymers subjected according to the present method result in transesterifed polylactic acid polymers. The transesterified polylactic acid polymers have desirable improved properties compared to polylactic acid such as: a liquid or waxy solid state at room temperature and improved solubility in a variety of solvents.

The transesterified polylactic acid product produced according to the present disclosure will find uses in a large variety of applications. It can be combined with other polymers including urethanes for use in adhesives, coatings, insulation formulations, films, as wetting agent for polyolefin films and as a laminate for a wide variety of applications including flexible packaging for food products such as juice pouches. The transesterified polylactic acid product also finds use in hot melt adhesives; in food packaging adhesives and coatings; and in the field of medical devices.

The following definitions are used throughout the present specification and claims. A natural oil means one derived from nature and may include, by way of example: soybean oil, castor oil, canola oil, sunflower oil, safflower oil, corn oil, peanut oil, almond oil, olive oil, coconut oil, palm oil, tall oil, and mixtures thereof. A diol is any structure including two reactive hydroxyl groups. The following abbreviations are used: mg means milligrams, g means grams; mol means mole; mmol means millimoles; ml means milliliters, L means liter. The term "OH number" means the hydroxyl value of a polymer and is defined as the number of milligrams of potassium hydroxide required to neutralize the acetic acid taken up on acetylation of one gram of a tested polymer that contains free hydroxyl groups.

The following is a general description of the transesterification process according to the present invention. At least a diol, a polylactic acid and optionally a transesterification catalyst are combined to form a reaction mixture and this reaction mixture is heated to a temperature below the degradation temperature of the reaction mixture components to form a molten reaction mixture. At least one natural oil is added to the molten reaction mixture and mixed at an elevated temperature until substantially homogeneous. The temperature of the substantially homogeneous mixture is increased to a temperature high enough for transesterification to proceed. The substantially homogeneous reaction mixture is maintained at or above this temperature until transesterification is completed to the desired extent. Once transesterification is completed to the desired extent the reaction mixture is cooled to a convenient temperature for handling and the transesterified polylactic acid reaction product is collected. Generally, the transesterification process is conducted until the reaction mixture forms a clear, homogeneous and single layered product. Initially, the combination of the molten reaction mixture and the natural oil forms a dual layered mixture.

The transesterification process is conducted in a reactor having thermal control, stirring, and a condenser. The reaction is preferably run under a blanket of a non-reactive gas such as nitrogen to exclude oxygen during the reaction and to aid in driving off the water produced during the reaction. The condenser and stirring process work to prevent unwanted loss of the diol during the reaction. In the transesterification process the amount of diol used is chosen based on the desired equivalent weight of the transesterified product. The process converts polylactic acid polymer to a transesterified polylactic acid product by reaction with diol and a natural oil in the presence of a catalyst.

In one embodiment and as a first step the reaction vessel is charged with the desired amount of diol, then the optional catalyst if desired and finally with the polylactic acid stock. The entire reaction procedure is preferably run under a blanket of an inert gas. The transesterification catalyst may be selected from a variety of catalysts including: phosphoric acid and esters thereof, sulfonic acids such as p-toluenesulfonic acid; and sulfuric acid. In addition base catalyzed reactions can be conducted using as the catalyst alkaline metal alkoxides, for example sodium methoxide ($CH_3ONa$); alkaline metal hydroxides, for example KOH or NaOH; or dibutyltin dilaurate; or tin octoate. In some embodiments no transesterification catalyst is used. The preferred transesterification catalyst is a titanium alkoxide, for example titanium (IV) butoxide. The number average molecular weight of the polylactic acid stock is not particularly limited and preferably comprises a polylactic acid having a number average molecular weight of from 2,000 to 200,000, and more preferably from 10,000 to 100,000. The reaction mixture is then heated to a temperature of at least 150° C., for example from 150° to 180° C. with stirring to melt the polylactic acid. So long as the temperature is great enough to form a molten reaction mixture without thermal degradation of the reaction components it will be sufficient. Once the mixture is completely molten the natural oil is added to the reaction mixture. The reaction mixture temperature is then increased to at least 170° C., for example from 170 to 195° C. with stirring for a suitable period of time, for example 3 hours. After 3 hours the temperature is increased to at least 190° C., for example 190 to 215° C. and held there for an additional period of time, for example 4 hours. Finally, the temperature is increased to at least 210° C., for example 210 to 245° C. and held there for a period of time, for example at least 7 hours, until a clear homogenous single layer is obtained. The reaction mixture initially starts out as a two layered mixture and as the transesterification reaction progresses it becomes a clear single layer. The reaction product is then cooled to a convenient handling temperature and removed from the reaction vessel. The reaction conditions cause the natural oil to break down into the constituent fatty acids and glycerol, which are then transesterified along with the diol into the polylactic acid polymer. The fatty acids that are derived from the natural oil are found as pendent chains attached to the resultant polylactic acid product. The diol and released glycerol are found at the terminal ends of polylactic acid product or they join polylactic acid chains together.

Useful diols for the present reaction include diethylene glycol, polypropylene glycol having a size range of from 400 to 2000 daltons, polyethylene glycol having a size range of from 400 to 2000 daltons, neopentyl glycol, propylene glycol, dipropylene glycol, hexane diol, ethylene glycol, 2-methyl-1,3propanediol, butane diol, and polytetrahydrofuran. The extra hydroxyl group when a glycerol joins two polylactic acid chains can also be the site of a transesterification reaction. Use of an appropriate amount of diol will result in an OH terminated distribution of the polyester with the glycerol and fatty acids incorporated into the polylactic acid polymer. The pendent fatty acids lower the viscosity of the resulting polylactic acid polymer while the polylactic acid backbone provides stiffness.

The transesterified polylactic acid product produced according to the present disclosure has surprising and advantageous properties that are not available in the parent polylactic acid. For example, a high molecular weight polylactic acid such as one with a number average molecular weight of approximately 160,000 is a solid that is insoluble in the solvent ethyl acetate. However, the transesterified polylactic acid product produced from it according to the present disclosure can be a liquid that is highly soluble in ethyl acetate. The renewable content of transesterified polylactic acid products produced according to the present invention is in the range of at least 70%.

Preferably the disclosed transesterified polylactic acid product has a hydroxyl number of from 10 to 600 mg KOH/gram, more preferably from 40 to 600 mg KOH/gram. Preferably the weight percentage of polylactic acid in the final product preferably ranges from 50 to 85 weight % based on total product weight, more preferably from 50 to 80 weight %. Preferably the weight percentage of natural oil incorporated into the final product as glycerol and fatty acids preferably ranges from 13 to 30 weight % based on the total product weight. Preferably the amount of diol incorporated into the final product ranges from 2 to 36 weight % based on the total product weight.

Testing Methods

The hydroxyl number for each sample was measured using titration with KOH using the standard procedure known to those of skill in the art. The results are presented as mg of KOH per g of material. The hydroxyl number is a measure of the content of free hydroxyl groups in a chemical substance, usually expressed in units of the mass of potassium hydroxide (KOH) in milligrams equivalent to the hydroxyl content of one gram of the chemical substance. The analytical method used to determine hydroxyl value traditionally involves acetylation of the free hydroxyl groups of the substance with acetic anhydride in pyridine solvent. After completion of the reaction, water is added, and the remaining unreacted acetic anhydride is converted to acetic and measured by titration with potassium hydroxide.

The viscosity of the products was measured using a Brookfield DV-1+ using spindle 27, per the manufacturer's instructions.

The number average molecular weight (Mn) and the weight average molecular weight (Mw) were determined by Gel Permeation Chromotography using dimethylacetamide (DMAc) as the solvent and polystyrene standards. The polydispersity index (PDI) is calculated as the ratio (Mw/Mn) as known to those of skill in the art.

The thermal stability of the samples was determined using thermogravimetric analysis (TGA) with polylactic acid, soybean oil and castor oil serving as the controls. By use of TGA we were able to measure the temperature of 5% weight loss in each sample for stability determinations.

Differential scanning calorimetry (DSC) was used to determine the melting temperature ($T_m$) and glass transition temperature ($T_g$) for each sample. The DSC was run from −90° C. up.

EXAMPLES

In a first example, designated Soybean-PLA-400, a 500 ml round bottomed flask equipped with a stirrer, a thermometer, a heating mantle, reflux condenser and nitrogen flush inlet was charged as follows: 60 g of diethylene glycol (565.40 mmoles) and then 110 g of a 80,000 g/mol polylactic acid stock (0.375 mmoles) was added. The catalyst, titanium (IV) butoxide, was initially dissolved in isopropanol at a level of 0.1 g/ml and then 0.4 ml of this solution was charged to the flask. The reaction mixture was heated with stirring to 150° C. to 165° C. to melt the polylactic acid. The entire reaction was run under a nitrogen blanket. Once the solution is fully melted 30 g of soybean oil, a natural oil, was added to the reaction mixture and the temperature was increased to 170 to 180° C. and maintained at this temperature with stirring for 3 hours. After 3 hours the temperature was increased to 190 to 200° C. and maintained at this temperature with stirring for an additional 4 hours. After the 4 hours the temperature was increased to 210 to 220° C. and maintained at this temperature with stirring for at least 7 hours or longer until the reaction product visually was a clear homogenous single layer. The heating mantle was removed and the product was allowed to cool to a convenient handling temperature and then the transesterified polylactic acid product was removed.

In a second example, designated Soybean-PLA-150, a 500 ml round bottomed flask equipped with a stirrer, a thermometer, a heating mantle, reflux condenser and nitrogen flush inlet was charged as follows: 26 g of diethylene glycol (245.00 mmoles) and then 110 g of a 80,000 g/mol polylactic acid stock was added (1.375 mmoles). The catalyst, titanium (IV) butoxide, was initially dissolved in isopropanol at a level of 0.1 g/ml and then 0.4 ml of this solution was charged to the flask. The entire reaction was conducted under a nitrogen blanket. The reaction mixture was heated with stirring to 150° C. to 165° C. to melt the polylactic acid. Once the solution is fully melted 30 g of soybean oil was added to the reaction mixture and the temperature was increased to 170 to 180° C. and maintained at this temperature with stirring for 3 hours. After 3 hours the temperature was increased to 190 to 200° C. and maintained at this temperature with stirring for an additional 4 hours. After the 4 hours the temperature was increased to 210 to 220° C. and maintained at this temperature with stirring for at least 7 hours or longer until the reaction product visually was a clear homogenous single layer. The heating mantle was removed and the product was allowed to cool to a convenient handling temperature and then the transesterified polylactic acid product was removed.

In a third example, designated Soybean-PLA-50, a 500 ml round bottomed flask equipped with a stirrer, a thermometer, a heating mantle, reflux condenser and nitrogen flush inlet was charged as follows: 10 g of diethylene glycol (94.23 mmoles) and then 110 g of a 80,000 g/mol polylactic acid stock (1.375 mmoles) was added. The catalyst, titanium (IV) butoxide, was initially dissolved in isopropanol at a level of 0.1 g/ml and then 0.4 ml of this solution was charged to the flask. The entire reaction was conducted under a nitrogen blanket. The reaction mixture was heated with stirring to 150° C. to 165° C. to melt the polylactic acid. Once the solution is fully melted 30 g of soybean oil was added to the mixture and the temperature was increased to 170 to 180° C. and maintained at this temperature with stirring for 3 hours. After 3 hours the temperature was increased to 190 to 200° C. and maintained at this temperature for an additional 4 hours. After the 4 hours the temperature was increased to 210 to 220° C. and maintained at this temperature for at least 7 hours or longer until the reaction product visually was a clear homogenous single layer. The heating mantle was removed and the product allowed to cool to a convenient handling temperature and then the transesterified polylactic acid product was removed.

In a fourth example, designated Castor-PLA-400, a 500 ml round bottomed flask equipped with a stirrer, a thermometer, a heating mantle, reflux condenser and nitrogen flush inlet was charged as follows: 60 g of diethylene glycol (565.40 mmoles) and then 110 G of a 80,000 g/mol stock of polylactic acid (1.375 mmoles) was added. The catalyst, titanium (IV) butoxide, was initially dissolved in isopropanol at a level of 0.1 g/ml and then 0.4 ml of this solution was charged to the flask. The entire reaction was conducted under a nitrogen blanket. The reaction mixture was heated with stirring to 150° C. to 165° C. to melt the polylactic acid. Once the solution is fully melted 31 g of castor oil, a natural oil, was added to the mixture and the temperature was increased to 170 to 180° C. and maintained at this temperature with stirring for 3 hours. After 3 hours the temperature was increased to 190 to 200° C. and maintained at this temperature for an additional 4 hours. After the 4 hours the temperature was increased to 210 to 220° C. and maintained at this temperature for at least 7 hours or longer until the reaction product visually was a clear homogenous single layer. The heating mantle was removed and the product allowed to cool to a convenient handling temperature and then the transesterified polylactic acid product was removed.

Two addition examples, designated Castor-PLA-150 and Castor-PLA-50, were conducted as described above using the same polylactic acid stock and process. Below in TABLE 1 is a listing of the reaction components used in each of the above examples. The oil name prefix denotes whether the natural oil used in the transesterification was soybean oil or castor oil. The numerical suffix (−50, −150 and −400) in sample name denoted the OH number of original fatty polyol. The higher the OH number, the lower the molecular weight of fatty polyol. The abbreviation PLA stands for polylactic acid.

TABLE 1

| Example | Diethylene glycol wgt % | Polylactic acid wgt % | Natural oil wgt % | Total % |
|---|---|---|---|---|
| Soybean-PLA-50 | 6.5 | 74.1 | 19.4 | 100 |
| Soybean-PLA-150 | 15.5 | 66.8 | 17.7 | 100 |
| Soybean-PLA-400 | 29.9 | 55.4 | 14.7 | 100 |
| Castor-PLA-50 | 4.9 | 73.8 | 21.3 | 100 |
| Castor-PLA-150 | 10.7 | 69.0 | 20.3 | 100 |
| Castor-PLA-400 | 29.5 | 55.0 | 15.5 | 100 |

Each of the prepared examples was then tested for a variety of parameters using the methods described herein. In a first analysis the hydroxyl number for each sample was determined as described herein, the results are presented in TABLE 2 below.

TABLE 2

| Example | OH value mg KOH/g |
|---|---|
| Soybean-PLA-50 | 34 |
| Soybean-PLA-150 | 133 |
| Soybean-PLA-400 | 278 |
| Castor-PLA-50 | 46 |
| Castor-PLA-150 | 116 |
| Castor-PLA-400 | 294 |

The number average molecular weight (Mn) and weight average molecular weight (Mw) of each sample was determined as described herein and the values were used to calculate the polydispersity index (PDI) (Mw/Mn) of each sample, the results are presented in TABLE 3 below. The results demonstrate that as the hydroxyl number increased the size of the transesterified polylactic acid product decreased as did the polydispersity of the samples.

TABLE 3

| Sample | $M_n$ | $M_w$ | PDI |
|---|---|---|---|
| Soybean-PLA-50 | 1534 | 2415 | 1.6 |
| Soybean-PLA-150 | 797 | 1120 | 1.4 |
| Soybean-PLA-400 | 719 | 779 | 1.1 |
| Castor-PLA-50 | 1760 | 3065 | 1.7 |
| Castor-PLA-150 | 883 | 1418 | 1.6 |
| Castor-PLA-400 | 807 | 913 | 1.1 |

Thermogravimetric analysis was used to determine the thermal stability of the samples. The temperature at which there was a 5% weight loss for each sample is presented below in TABLE 4. In general, all of the samples were thermally stable up to 200° C., with the higher molecular weights showing higher thermal stability.

TABLE 4

| Sample | 5% weight loss temperature ° C. |
|---|---|
| Soybean-PLA-50 | 228 |
| Soybean-PLA-150 | 235 |
| Soybean-PLA-400 | 200 |
| Castor-PLA-50 | 235 |
| Castor-PLA-150 | 222 |
| Castor-PLA-400 | 188 |
| Polylactic acid | 363 |
| Castor oil | 379 |
| Soybean oil | 396 |

Differential scanning calorimetry (DSC) was used to analyze the thermal transitions of the samples including for determination of the glass transition temperature ($T_g$). The values are compared to the values for polylactic acid itself. The results are shown below in TABLE 5. The results demonstrate that transesterification with the natural oils significantly reduced the $T_g$ of the transesterified polylactic acid product. The $T_g$ of the samples also decreased with the decrease in molecular weight of the sample. The experimental samples showed no observable melting temperature in the range of −90° C. to 25° C., they were all liquid in this temperature range.

TABLE 5

| Sample | $T_g$ (° C.) | $T_m$ (° C.) |
|---|---|---|
| Soybean-PLA-50 | −16 | [1] |
| Soybean-PLA-150 | −25 | [1] |
| Soybean-PLA-400 | −57 | [1] |
| Castor-PLA-50 | −8 | [1] |
| Castor-PLA-150 | −34 | [1] |
| Castor-PLA-400 | −54 | [1] |
| Polylactic acid | 56 | 152 |

[1] These materials are liquid at room temperature.

The viscosity of each sample was measured as described herein and the results are presented below in TABLE 6.

TABLE 6

| Sample | Viscosity (cP) | Temp. ° C. | RPM |
|---|---|---|---|
| Soybean-PLA-50 | 26800 | 50 | 0.3 |
| Soybean-PLA-150 | 6200 | 25 | 1.5 |
| Soybean-PLA-400 | 370 | 25 | 30 |
| Castor-PLA-50 | 39600 | 40 | 0.3 |
| Castor-PLA-150 | 35250 | 25 | 0.3 |
| Castor-PLA-400 | 440 | 25 | 30 |

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A transesterified polylactic acid resulting from the reaction of a reaction mixture comprising:
    a) polylactic acid;
    b) at least one natural oil;
    c) a diol; and
    d) optionally, a transesterification catalyst;
    wherein the transesterified polylactic acid is a liquid at room temperature.

2. The transesterified polylactic acid as recited in claim 1, wherein said transesterified polylactic acid has a hydroxyl number of from 10 to 600 milligrams of KOH per gram of transesterified polylactic acid.

3. The transesterified polylactic acid as recited in claim 1, wherein said transesterified polylactic acid has a hydroxyl number of from 40 to 600 milligrams of KOH per gram of transesterified polylactic acid.

4. A transesterified polylactic acid resulting from the reaction of a reaction mixture comprising:
    a) polylactic acid;
    b) at least one natural oil;
    c) a diol selected from the group consisting of diethylene glycol, polypropylene glycol, polyethylene glycol, neopentyl glycol, propylene glycol, dipropylene glycol, hexane diol, ethylene glycol, 2-methyl-1,3-propanediol, butane diol, polytetrahydrofuran, and mixtures thereof; and
    d) optionally, a transesterification catalyst.

5. The transesterified polylactic acid as recited in claim 1, wherein said at least one natural oil is selected from the group consisting of soybean oil, castor oil, canola oil, sunflower oil, safflower oil, corn oil, peanut oil, almond oil, olive oil, coconut oil, palm oil, tall oil, and mixtures thereof.

6. The transesterified polylactic acid as recited in claim 1, wherein said polylactic acid has a number average molecular weight of from 2,000 to 200,000.

7. A composition comprising the transesterified polylactic acid as recited in claim 1.

8. A method of transesterifying polylactic acid comprising the steps of:
    a) combining a diol, a polylactic acid and, optionally, a transesterification catalyst together to form a reaction mixture and heating it to a first temperature below a degradation temperature of the diol and the polylactic acid to form a molten reaction mixture;
    b) adding to the molten reaction mixture at least one natural oil and mixing until substantially homogeneous;
    c) heating the substantially homogeneous mixture to a temperature high enough for transesterification to proceed and maintaining this temperature for a desired time; and
    d) cooling the reaction mixture and collecting the transesterified polylactic acid reaction product.

9. The method as recited in claim 8, wherein the amount of polylactic acid in step a) comprises 50 to 85 weight percent of the total weight of the combination of steps a) and b).

10. The method as recited in claim 8, wherein the amount of natural oil in step b) comprises 13 to 30 weight percent of the total weight of the combination of steps a) and b).

11. The method as recited in claim 8, wherein the polylactic acid in step a) comprises a polylactic acid having a number average molecular weight of from 2,000 to 200,000.

12. The method as recited in claim 8, wherein the diol in step a) is present in an amount of from 2 to 36 weight percent of the total weight of the combination of steps a) and b).

13. The method as recited in claim 8, wherein the at least one natural oil in step b) is selected from the group consisting of soybean oil, castor oil, canola oil, sunflower oil, safflower oil, corn oil, peanut oil, almond oil, olive oil, coconut oil, palm oil, tall oil, and mixtures thereof.

14. The method as recited in claim 8, wherein the transesterification catalyst in step a) is a titanium alkoxide.

15. The method as recited in claim 14, wherein the transesterification catalyst is titanium (IV) butoxide.

16. The method as recited in claim 8, wherein the transesterified polylactic acid has a hydroxyl number of 10 to 600 milligrams of KOH per gram of transesterified polylactic acid reaction product.

17. The method as recited in claim 8 wherein the diol in step a) is selected from the group consisting of diethylene glycol, polypropylene glycol, polyethylene glycol, neopentyl glycol, propylene glycol, dipropylene glycol, hexane diol, ethylene glycol, 2-methyl-1,3-propanediol, butane diol, polytetrahydrofuran, and mixtures thereof.

18. The transesterified polylactic acid as recited in claim 1 wherein the weight percentage of a) polylactic acid in the final transesterified polylactic acid ranges from 50 to 85 weight % based on total product weight, the weight percentage of b) natural oil incorporated as glycerol and fatty acids in the final transesterified polylactic acid ranges from 13 to 30 weight % based on the total product weight, and the amount of c) diol in the final transesterified polylactic acid ranges from 2 to 36 weight % based on the total product weight.

* * * * *